United States Patent
Nimavat et al.

(10) Patent No.: US 12,472,668 B2
(45) Date of Patent: Nov. 18, 2025

(54) FLEX PLATE FOR GUIDING DEVICE OF INJECTION MOLDING MACHINE

(71) Applicant: MILACRON LLC, Cincinnati, OH (US)

(72) Inventors: Darshit Kishorkumar Nimavat, Batavia, OH (US); Benjamin Faul Waldman, Batavia, OH (US)

(73) Assignee: MILACRON MARKETING COMPANY LLC, Batavia, OH (US)

( * ) Notice: Subject to any disclaimer, the term of this patent is extended or adjusted under 35 U.S.C. 154(b) by 197 days.

(21) Appl. No.: 17/877,234

(22) Filed: Jul. 29, 2022

(65) Prior Publication Data

US 2024/0033983 A1   Feb. 1, 2024

(51) Int. Cl.
  *B29C 45/26* (2006.01)
  *B29C 45/17* (2006.01)

(52) U.S. Cl.
  CPC ...... *B29C 45/2606* (2013.01); *B29C 45/1761* (2013.01); *B29C 2045/1763* (2013.01)

(58) Field of Classification Search
  CPC ..... B29C 45/00; B29C 45/17; B29C 45/2606; B29C 45/1761; B29C 2045/1783
  See application file for complete search history.

(56) References Cited

U.S. PATENT DOCUMENTS

| | | |
|---|---|---|
| 6,896,508 B2 | 5/2005 | Kruger et al. |
| 8,888,484 B2 | 11/2014 | Ammer et al. |
| 2010/0020422 A1 | 1/2010 | Liao |
| 2014/0113022 A1 | 4/2014 | Ammer et al. |
| 2020/0002028 A1 | 1/2020 | Lamy et al. |
| 2020/0061891 A1 * | 2/2020 | Faulkner ............ B29C 45/2602 |

FOREIGN PATENT DOCUMENTS

| | | | |
|---|---|---|---|
| CN | 111288118 A * | 6/2020 | ............ B66F 17/006 |
| EP | 0310807 A1 | 4/1989 | |

OTHER PUBLICATIONS

CN111288118 translation from ESpaceNet accessed Jan. 7, 2024 (Year: 2020).*

* cited by examiner

*Primary Examiner* — Alison L Hindenlang
*Assistant Examiner* — Erica Hartsell Funk
(74) *Attorney, Agent, or Firm* — DINSMORE & SHOHL LLP (57) ABSTRACT

A flex plate for a guiding device of an injection molding machine includes a body extending between a front surface, a back surface, a top surface, and a bottom surface. A plurality of through holes extend between the top surface and the bottom surface for aligning the flex plate with a foot of the guiding device, and a plurality of guide shoe holes formed in the bottom surface of the flex plate couple the flex plate to a guide shoe of the guiding device. A front plate couples the front surface of the flex plate to the foot of the guiding device, and a plurality of slots define a central portion of the flex plate. The central portion of the flex plate is elastically deformable about a torsional axis and can pivot relative to the guide shoe and foot of the guiding device.

11 Claims, 11 Drawing Sheets

FLEX PLATE FOR GUIDING DEVICE OF INJECTION MOLDING MACHINE

TECHNICAL FIELD

The present specification generally relates to guiding devices of injection molding machines, and more specifically, to flex plates for supporting guiding devices of an injection molding machine.

BACKGROUND

In injection molding machines, guide shoes and guide rails are used for guiding the movement of the moving platen relative to the fixed platen. However, because of the speeds at which the moving platen engages the fixed platen, the forces exerted may be transferred to the guide shoes and guide rails that are supporting the moving platen. As a consequence, the guide shoes and guide rails may be worn or/and damaged. Accordingly, a need exists for a guiding device which is capable of compensating for the deformations of the mold platen in order to increase the working life of the guide shoes and guide rails.

SUMMARY

In an embodiment, a flex plate for a guiding device of an injection molding machine is disclosed. The flex plate includes a body extending between a front surface, a back surface, a top surface, and a bottom surface, and a plurality of through holes extend between the top surface and the bottom surface for attaching the flex plate with a foot of the guiding device. A plurality of guide shoe holes are formed in the bottom surface of the flex plate for coupling the flex plate to a guide shoe of the guiding device. The flex plate further includes a front plate for coupling the front surface of the flex plate and the foot of the guiding device, and a plurality of slots defining a central portion of the flex plate. The central portion of the flex plate may be elastically deformable about a torsional axis such that the central portion can pivot relative to both the guide shoe and the foot of the guiding device.

In another embodiment, a guiding device of an injection molding machine is disclosed. The guiding device may include a first leg and a second leg, with each of the first leg and second leg having a front foot and a back foot. A plurality of flex plates may be coupled to the front foot and the back foot of both the first leg and the second leg, with the plurality of flex plates being elastically deformable about a torsional axis. A plurality of guide shoes may be coupled to the plurality of flex plates, and may be configured for coupling the guiding device to the injection molded machine. The flex plates are coupled to the front foot and the back foot of the first leg and the second leg such that the plurality of flex plates on each of the first leg and the second leg are positioned in a mirrored orientation.

In yet another embodiment, an injection molding machine is disclosed. The injection molding machine includes a guiding device having a first leg and a second leg, with each of the first leg and second leg having a front foot and a back foot. The guiding device further includes a plurality of flex plates coupled to the front foot and the back foot of both the first leg and the second leg, with the plurality of flex plates being elastically deformable about a torsional axis. A plurality of guide shoes are coupled to the plurality of flex plates, with the plurality of guide shoes being configured for coupling the guiding device to the injection molded machine. The plurality of flex plates are coupled to the front foot and the back foot of the first leg and the second leg such that the plurality of flex plates on each of the first leg and the second leg are positioned in a mirrored orientation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein relate to flex plates, guiding devices, and injection molding machines. More specifically, the present disclosure includes a flex plate which may be coupled between a foot and a guide shoe of a guiding device. In these embodiments, the flex plate may be coupled to both the foot and the guide shoe of the guiding device. The flex plate may further include an elastically deformable central portion that may allow the flex plate to pivot relative to both the guide shoe and the foot of the guiding device.

As provided herein, the term "guide shoe" may refer to an elongated, rigid component with means for receiving a sliding and/or rolling element (e.g., a guide rail, etc.). In the embodiments described herein, the guide shoe may act as a connector to couple the guiding device to the guide rail.

As provided herein, the term "foot" may refer to an elongated end portion of the guiding device which extends in a longitudinal direction and receives the guide shoe.

As provided herein, the term "through hole" may refer a hole that is made to extend completely through the material of an object. For example, a through hole may be considered a hole which is formed in a first surface an object and extends completely through a second surface of an object.

As provided herein, the term "blind hole" may refer to a hole that is reamed, drilled, or milled to a specified depth without breaking through to an opposing surface of an object. For example, a blind hole may be considered a hole which is formed in a first surface of an object but does not extend through a second surface of an object.

As provided herein, the term "mirrored orientation" may refer to multiple components which are a reflected duplication of one another but are reversed in a direction perpendicular to one another. It should be understood that the term may relate to structural as well as visual aspects of the multiple components.

In injection molding machines, guiding devices are commonly used for translating a mold platen between an open position and a closed position in which the injection molding occurs. Typically, these guiding devices traverse a sliding and/or rolling element, such as a guide rail, to move the mold platen between the open position and the closed position. In order to ensure optimum part quality, it is desirable to maintain a high degree of parallelism between the guide rails, such that uniform contact is achieved between the mold platen and the mold in the closed position. However, during the injection molding process, the mold platen is translated from the open position to the closed position at extremely high speeds. The speed at which the platen is translated cause high injection pressure forces to be exerted on the mold platen, which may cause the mold platen to experience minor elastic deformation. Over time, these injection pressure forces may be transferred from the mold platen to the guide rails, which may cause similar deformation and other damage to the guide rails.

To compensate for the injection pressure forces exerted on the mold platen, current injection molding machines utilize guide shoes placed on the feet of the guiding device. These guide shoes may act as an intermediary component positioned between the guiding device and the guide rails, and may include a deformation element in a connecting region which allow the guide shoe to compensate for deformations in the mold platen. Although these guide shoes may help alleviate the injection forces exerted on the guiding device, these forces will, over time, result in similar damage to the guide shoes.

The present disclosure relates to a flex plate which may be positioned between the guiding device and the guide shoe, and may act to alleviate injection pressure forces exerted on both elements. As will be described in additional detail herein, the flex plate may be coupled to both the guiding device and the guide shoe in such a manner that the flex plate is pivotable relative to both the guiding device and the guide shoe. By allowing for deformation from both the guiding device and the guide shoe, the flex plate is capable of absorbing the forces exerted on the guide shoes and guide rails, thereby minimizing damage to the components during the injection molding process and increasing the work life of the components.

Embodiments of the flex plates and guiding devices for injection molding machines will now be described in more detail herein. The following will now describe these plates, devices, and machines in more detail with reference to the drawings and where like numbers refer to like structures.

Figure 1:
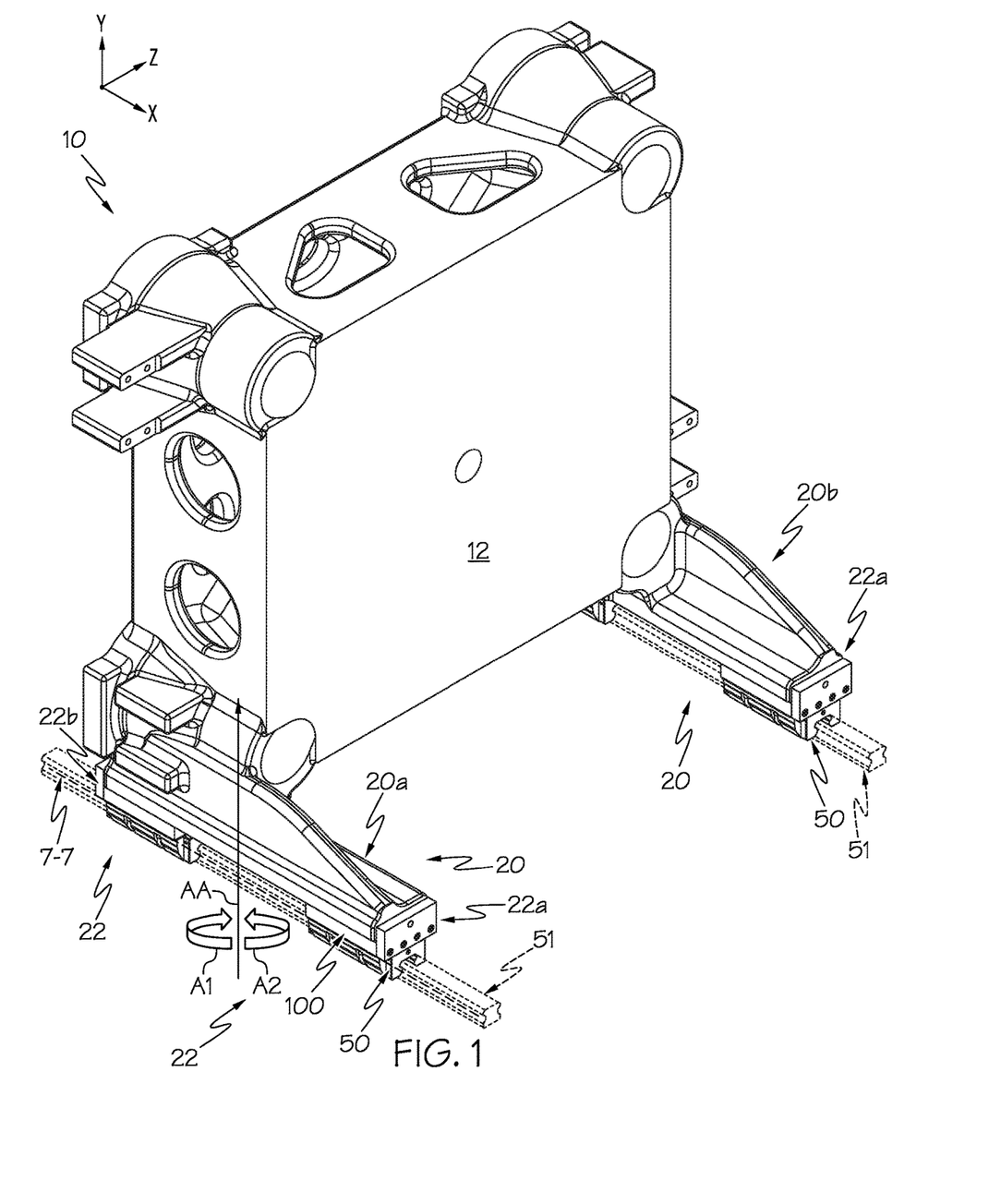
FIG. 1 depicts a perspective view of a guiding device for an injection molding machine, according to one or more embodiments shown and described herein.

Referring to FIG. 1, a guiding device 10 for an injection molding machine is depicted. The guiding device 10 may include a plurality of legs 20, such as a first leg 20a and a second leg 20b, that extend outwardly in a longitudinal direction (+x direction as illustrated in the coordinate axis of FIG. 1) from a platen 12 of the guiding device 10. In these embodiments, the plurality of legs 20 may include a plurality of feet 22, such as a front foot 22a and a back foot 22b. For example, as illustrated in FIG. 1, the first leg 20a may include a front foot 22a and a back foot 22b, while the second leg 20b may also include a front foot 22a and a back foot 22b. In these embodiments, the front foot 22a may be considered the foot which extends longitudinally away from the platen 12 (in the +x direction as illustrated in the coordinate axis of FIG. 1), while the back foot 22b may be considered the foot which is positioned adjacent the platen 12.

Figure 2:
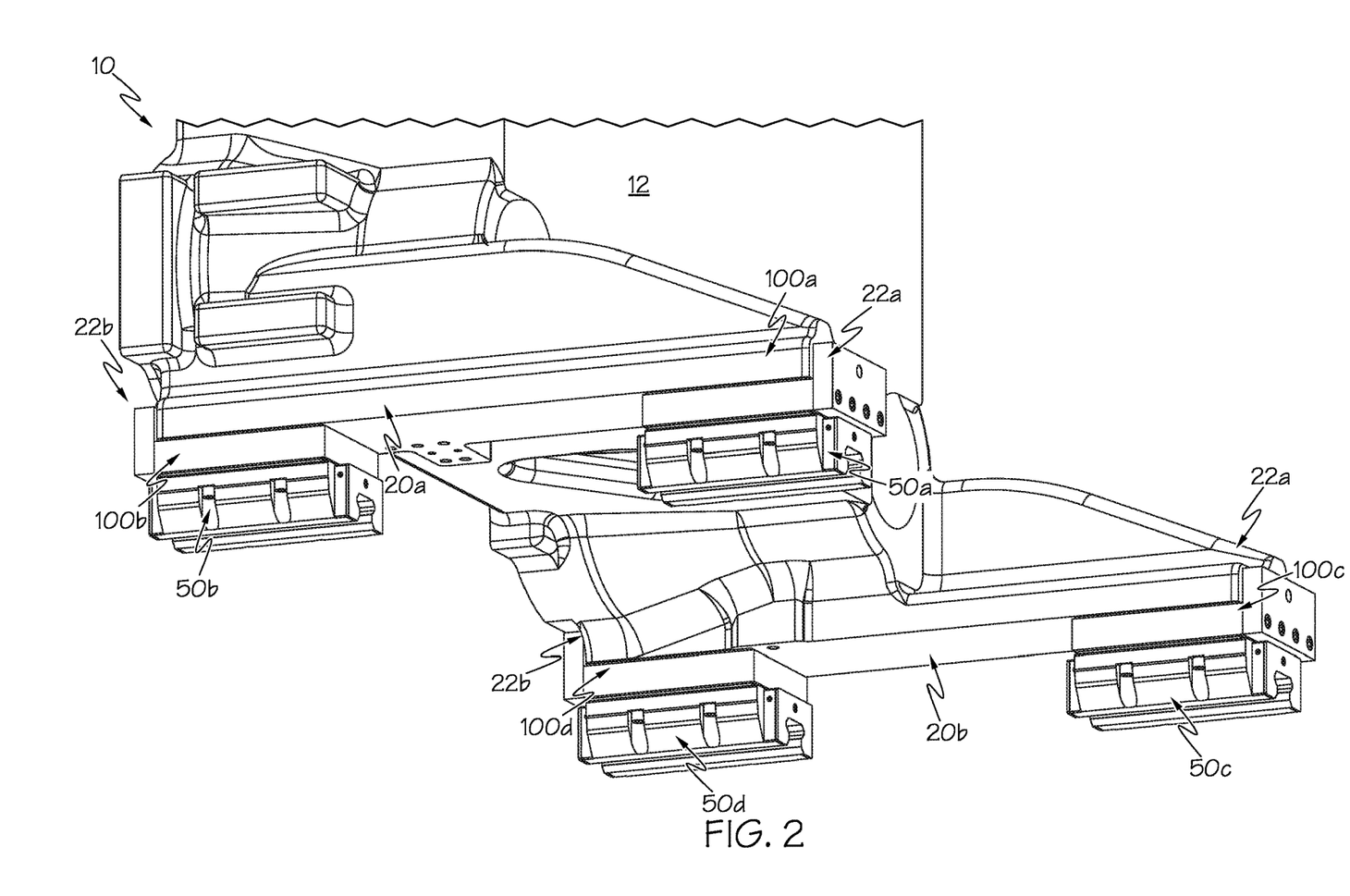
FIG. 2 depicts a partial bottom-side perspective view of the guiding device of FIG. 1, according to one or more embodiments shown and described herein.

Referring now to FIGS. 1 and 2, the guiding device 10 may further include a plurality of guide shoes 50. In these embodiments, the plurality of guide shoes 50 may include an opening 52 which receives a rolling and/or sliding element of an injection molding machine (not pictured) in order to couple the guiding device 10 to the injection molding machine. As depicted in FIG. 1, each of the plurality of feet 22 may include one of the plurality of guide shoes 50. For example, the front foot 22a of the first leg 20a may include a first shoe 50a, the back foot 22b of the first leg 20a may include a second shoe 50b, the front foot 22a of the second leg 20b may include a third shoe 50c, and the back foot 22b of the second leg 20b may include a fourth shoe 50d. Although the guiding device 10 of FIG. 1 is depicted as having four shoes, it should be understood that the number of the plurality of guide shoes 50 may correspond to the number of the plurality of feet 22 of the guiding device 10.

Figure 3A:
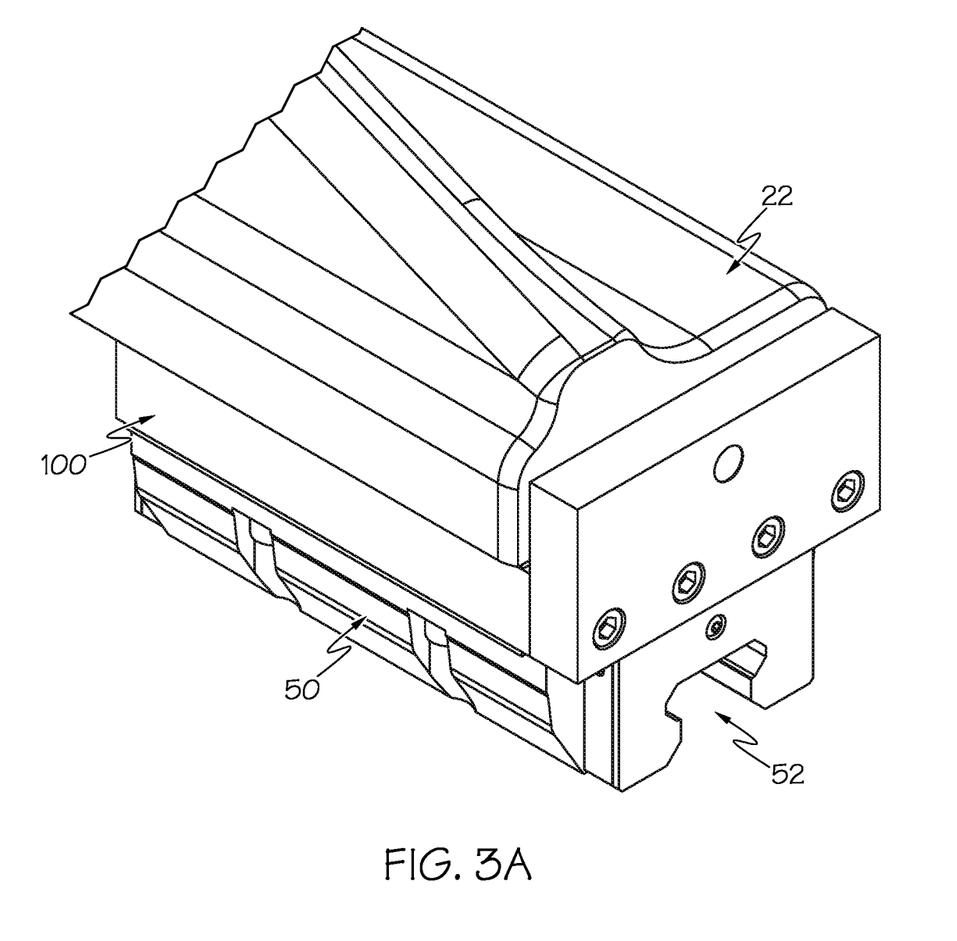
FIG. 3A depicts a perspective view of a foot, flex plate, and shoe of the guiding device of FIG. 1, according to one or more embodiments shown and described herein.

Referring now to FIGS. 2 and 3A, the guiding device 10 may further include a plurality of flex plates 100. In these embodiments, the plurality of flex plates 100 may be coupled to the guiding device 10 between the plurality of guide shoes 50 and the plurality of feet 22. Furthermore, the plurality of flex plates 100 may be independently coupled to both the plurality of guide shoes 50 and the plurality of feet 22, such that the plurality of flex plates 100 may be pivotable about both the plurality of guide shoes 50 and the plurality of feet 22, as will be described in additional detail herein.

As depicted in FIGS. 2 and 3A, one of the plurality of flex plates 100 may be positioned between each of the plurality of guide shoes 50 and the plurality of feet 22. For example, a first flex plate 100a may be positioned between the first shoe 50a and the front foot 22a of the first leg 20a, a second flex plate 100b may be positioned between the second shoe 50b and the back foot 22b of the first leg 20a, a third flex plate 100c may be positioned between the third shoe 50c and the front foot 22a of the second leg 20b, and a fourth flex plate 100d may be positioned between the fourth shoe 50d and the back foot 22b of the second leg 20b. Although the guiding device 10 of FIG. 2 is depicted as having four flex plates 100, it should be understood that the number of the plurality of flex plates 100 may correspond to the number of the plurality of feet 22 and the number of the plurality of guide shoes 50 of the guiding device 10.

Figure 3B:
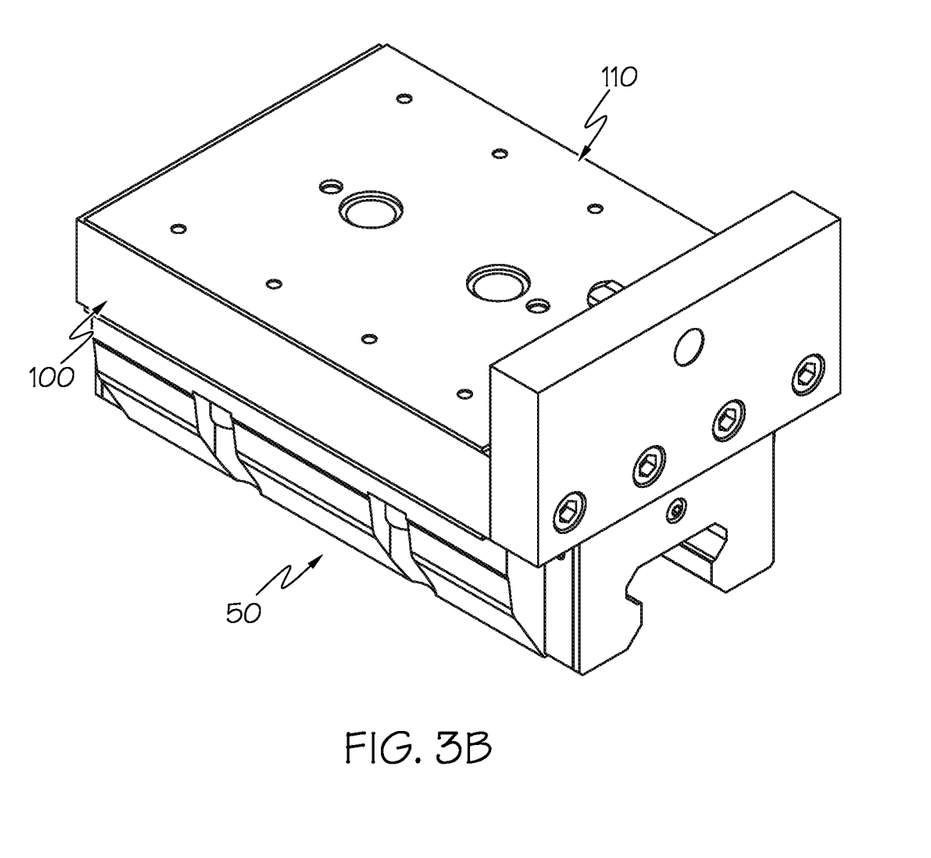
FIG. 3B depicts a perspective view of the guiding device of FIG. 3B further including a support plate, according to one or more embodiments shown and described herein.

Referring now to FIG. 3B, the guiding device 10 may further include a plurality of support plates 110. In these embodiments, the plurality of support plates 110 may be positioned between the plurality of flex plates 100 and the plurality of feet 22. Additionally, the plurality of support plates 110 may be provided between the plurality of the flex plates 100 and the plurality of guide shoes 50.

Figure 4:
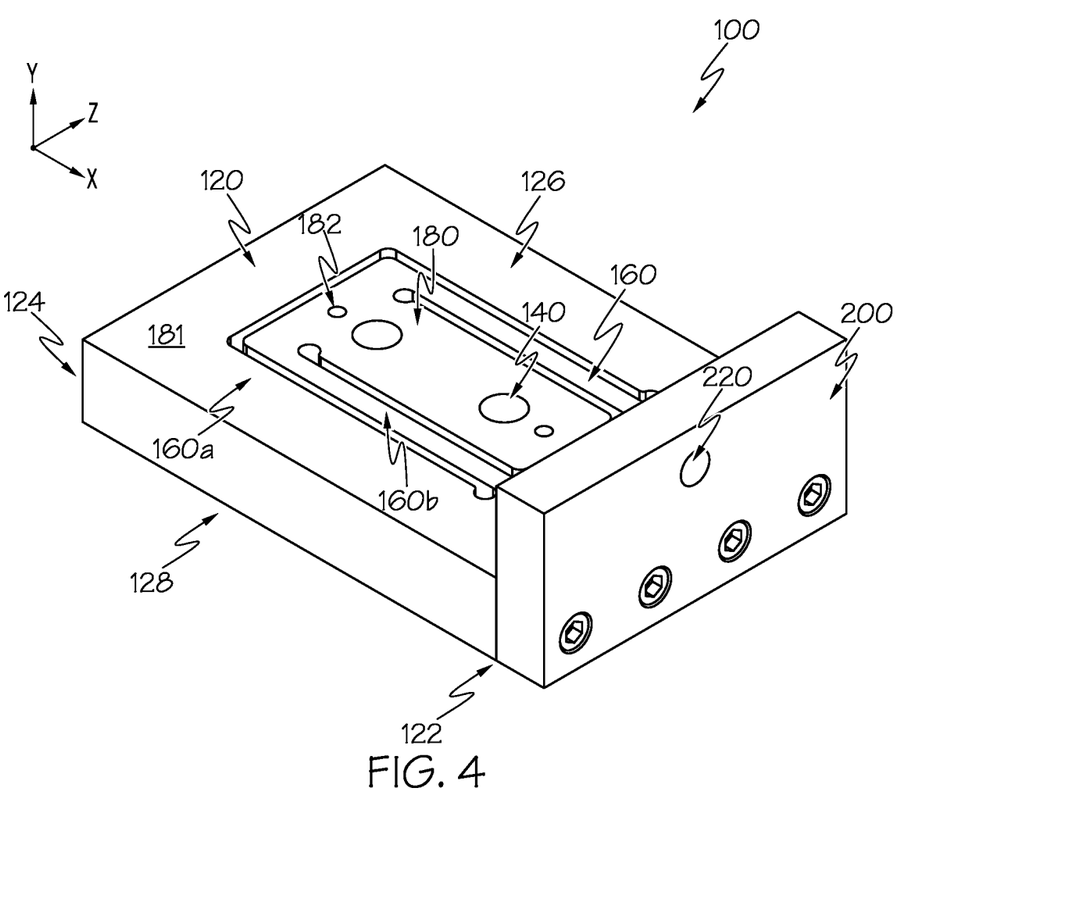
FIG. 4 depicts a perspective view the flex plate of FIG. 3, according to one or more embodiments shown and described herein.

Turning now to FIG. 4, the flex plate 100 is depicted. The flex plate 100 may include a body 120 extending between a front surface 122, a back surface 124, a top surface 126 and a bottom surface 128. In these embodiments, the flex plate 100 may further include a front plate 200 that may be releasably coupled to the front surface 122 of the flex plate 100. It should be understood that the front plate 200 may be releasably coupled to the flex plate 100 by any suitable releasable coupling means (bolts, screws, pins, etc.).

Figure 5:
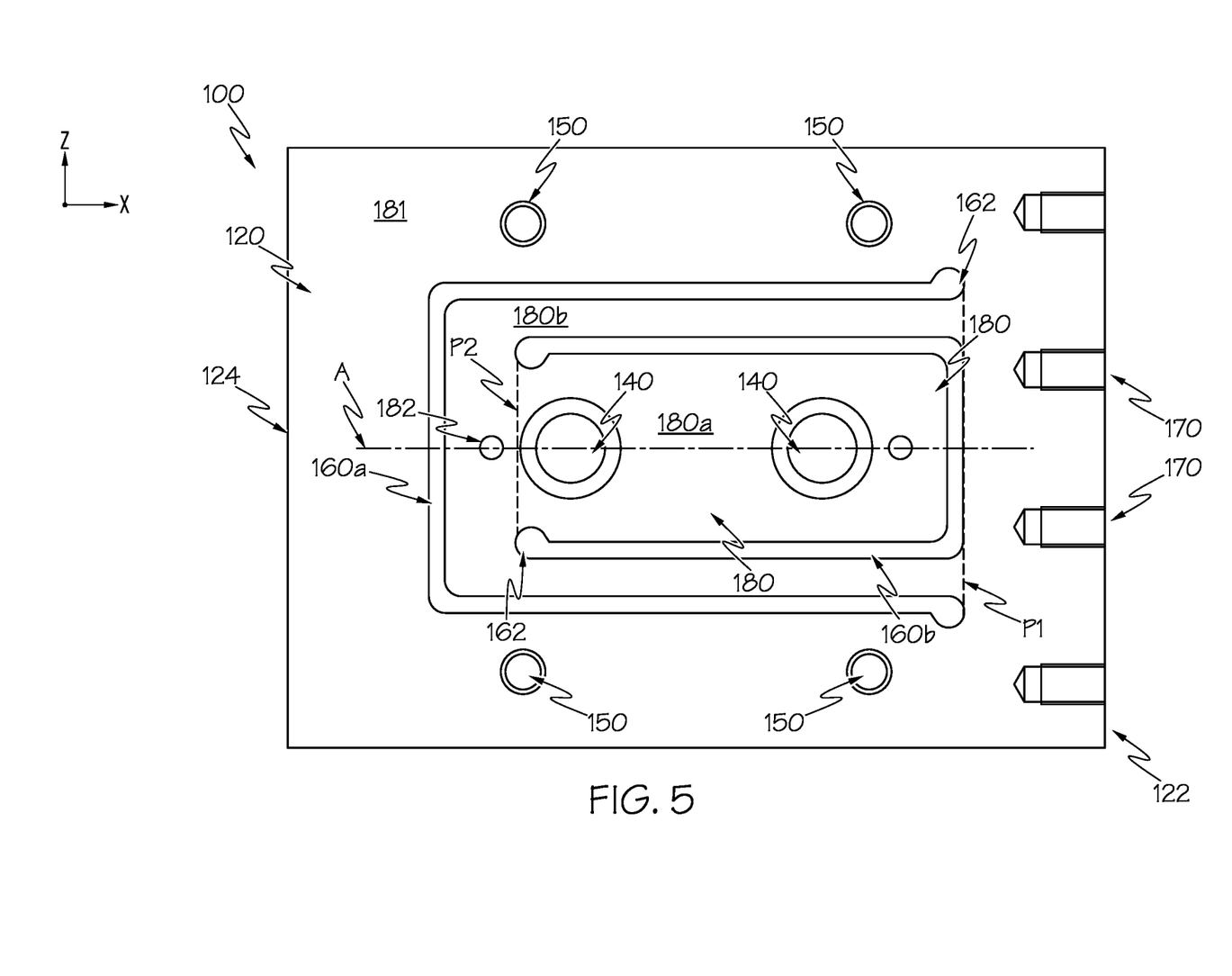
FIG. 5 depicts a top-side transparent view of a body of the flex plate of FIG. 4, according to one or more embodiments shown and described herein.

Referring now to FIGS. 4 and 5, the flex plate 100 may also include a plurality of slots 160. Each of the plurality of slots 160 may extend completely through the body 120 of the flex plate 100 from the top surface 126 to the bottom surface 128 of the flex plate 100. In these embodiments, the plurality of slots 160 may include a plurality of U-shaped slots. However, it should be understood that the plurality of slots 160 may take any other suitable shape.

In the embodiment depicted in FIGS. 4 and 5, the plurality of slots 160 may include a first slot 160a, such as an outer slot, and a second slot 160b, such as an inner slot. In these embodiments, the first slot 160a may be disposed outside and/or about the second slot 160b. Further still, the first slot 160a and the second slot 160b may be formed in the body 120 of the flex plate 100 such that the first and second slots 160a, 160b are inverted from one another. For example, as shown in FIGS. 4 and 5, the open end of the U-shape of the first slot 160a may be directed towards the front surface 122 of the flex plate 100, while the second slot 160b may be inverted, such that the open end of the U-shape of the second slot 160b may be directed towards the back surface 124 of the flex plate 100.

In these embodiments, the first slot 160a and the second slot 160b may define a central portion 180 and a perimeter portion 181 of the flex plate 100. For example, the central portion 180 of the flex plate 100 may be defined as the portion of the flex plate 100 that is positioned within a perimeter of the first slot 160a. As depicted in FIG. 5, the central portion 180 may be considered the portion of the flex plate 100 which is enclosed by the first slot 160a and first perimeter line $P_1$. It should be noted that, because the first slot 160a and the second slot 160b extend completely through the body 120 of the flex plate 100, the central portion 180 of the flex plate 100 may be elastically deformable within the first slot 160a and the second slot 160b, as will be described in more detail herein. Furthermore, the perimeter portion 181 of the flex plate 100 may be considered the area of the body 120 of the flex plate 100 which is positioned outside the central portion 180 of the flex plate 100. The perimeter portion 181 and the central portion 180 may be pivotable relative to each other when one portion is attached to the respective foot 22 to which the flex plate 100 is coupled and the other portion is attached to the respective shoe 50 to which the flex plate 100 is coupled.

As further illustrated in FIG. 5, in some embodiments, the central portion 180 may further include an inner central portion 180a and an intermediary central portion 180b. In these embodiments, the inner central portion 180a may be within an area defined by the second slot 160b. More specifically, the inner central portion 180a may be considered the area which is enclosed by the second slot 160b and second perimeter line $P_2$. In contrast, the intermediary central portion 180b may be considered the area which is enclosed by the first slot 160a and the first perimeter line $P_1$ and is outside the inner central portion 180a. In these embodiments, the intermediary central portion 180b may be the portion of the flex plate 100 which is positioned between the inner central portion 180a and the perimeter portion 181.

As further depicted in FIGS. 4 and 5, the plurality of slots 160 may each include a plurality of endpoints 162. In these embodiments, the endpoints 162 may have a curved and/or circular shape. Because the central portion 180 of the flex plate 100 may be deformable within the first slot 160a and second slot 160b, the curved and/or circular shape of the plurality of endpoints 162 may alleviate stress on the first and second slots 160a, 160b and help avoid breakage.

As most clearly illustrated in FIG. 5, the flex plate 100 may further include a plurality of through holes 140, which may extend completely though the body 120 between the top surface 126 and the bottom surface 128. In these embodiments, the through holes 140 may be used to attach the flex plate 100 with an end portion of one of the plurality of feet 22 of the guiding device 10. For example, in some embodiments, the flex plate 100 may be releasably coupled to one of the plurality of feet 22 by providing a screw, or other similar releasable coupler, through the plurality of through holes 140 of the flex plate 100 and into a plurality of recesses (not pictured) in the end portion of the one of the plurality of feet 22 to which the flex plate 100 is coupled. It should be understood that releasably coupling the flex plate 100 to one of the plurality of feet 22 may allow for the flex plate 100 to be easily replaced in the event the flex plate 100 is damaged, without causing any additional stress or damage to the foot 22.

As shown in FIG. 5, the plurality of through holes 140 may be positioned within the central portion 180 of the flex plate 100, and more specifically, within the inner central portion 180a of the flex plate 100. It should be understood that when the inner central portion 180a is attached to the foot 22, the inner central portion 180a may deform relative to the perimeter portion 181 when a torsional force is applied to the foot 22 of the guiding device 10 to which the flex plate 100 is coupled, as will be described in more detail herein. The flex plate 100 may further include alignment holes 182 to facilitate installation of the flex plate 100 into guiding device 10. During installation of the flex plate 100 to the foot 22, alignment dowels (not shown) may be inserted into alignment holes 182 and matching holes (not shown) on the foot 22. With the flex plate aligned with the foot 22, fasteners (e.g., bolts, screws) may be used to removably attach the flex plate 100 to the foot 22. In the illustrated embodiments, the alignment holes 182 and through holes 140 are located on central axis A of flex plate 100.

Referring still to FIG. 5, the flex plate 100 may include a plurality of guide shoe holes 150. (In these embodiments, the guide shoe holes 150 are blind holes but other suitable holes (e.g., through holes) are contemplated.) In these embodiments, the plurality of guide shoe holes 150 may be formed in the bottom surface 128 of the flex plate 100, and may extend through a portion of the body 120 of the flex plate 100 in a direction towards the top surface 126. The plurality of guide shoe holes 150 may be used to align and couple the flex plate 100 with one of the plurality of guide shoes 50 of the guiding device 10. For example, the flex plate 100 may be releasably coupled to the shoe by providing a screw, or other similar releasable coupler, through the one of the plurality of guide shoes 50 and into the plurality of guide shoe holes 150 of the flex plate 100. It should be understood that releasably coupling the flex plate 100 to one of the plurality of guide shoes 50 may allow for the flex plate 100 to be easily replaced in the event the flex plate 100 is damaged, without causing any additional stress or damage to the foot.

As further depicted in FIG. 5, the plurality of guide shoe holes 150 may be positioned outside the central portion 180 of the flex plate 100 on the perimeter portion 181, and more specifically, outside the area defined by the first slot 160a and the first perimeter line $P_1$. Because the plurality of guide shoe holes 150 are positioned outside the central portion 180 of the flex plate 100, when the plurality of guide shoe holes 150 are used to attach the perimeter portion 181 to the guide shoe 50, the central portion 180 may pivot relative to the guide shoe 50, as will be described in more detail herein.

Referring again to FIG. 5, the flex plate 100 may further include a plurality of apertures 170 formed in the front surface 122 of the body 120 of the flex plate 100. In these embodiments, the plurality of apertures 170 may extend partially through the body 120 from the front surface 122 of the body 120 towards the back surface 124 of the body 120 (e.g., in the −x direction as illustrated in the coordinate axis of FIG. 5). The plurality of apertures 170 may be aligned with openings 210 in the front plate 200 to releasably couple the front plate 200 to the front surface 122 of the body 120 of the flex plate 100.

Figure 6A:
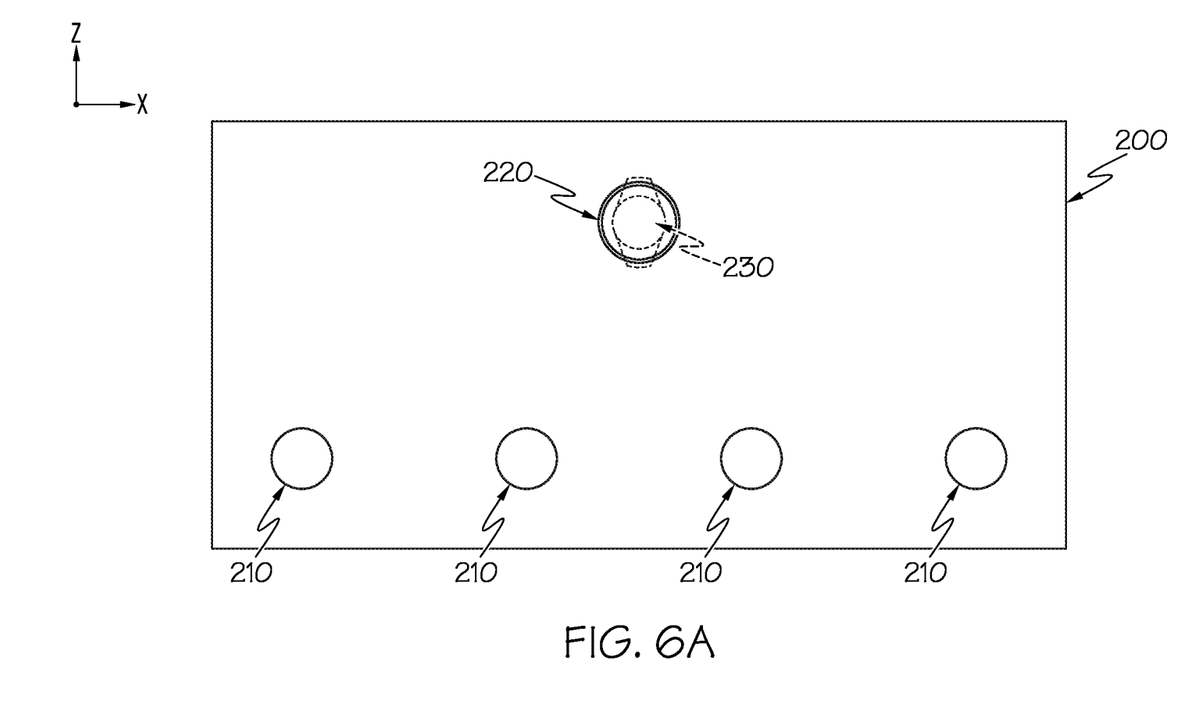
FIG. 6A depicts a front-side view of a front plate of the flex plate of FIG. 4, according to one or more embodiments shown and described herein.

Turning now to FIG. 6A, a front-side view of the front plate 200 is depicted. As illustrated, the front plate 200 may include a plurality of openings 210 which align with the plurality of apertures 170 formed in the front surface 122 of the flex plate 100. In these embodiments, screw, or any other suitable releasable coupler, may be inserted through the plurality of openings 210 in the front plate 200 and into the plurality of apertures 170 of the flex plate 100 in order to releasably couple the front plate 200 to the flex plate 100.

Figure 6B:
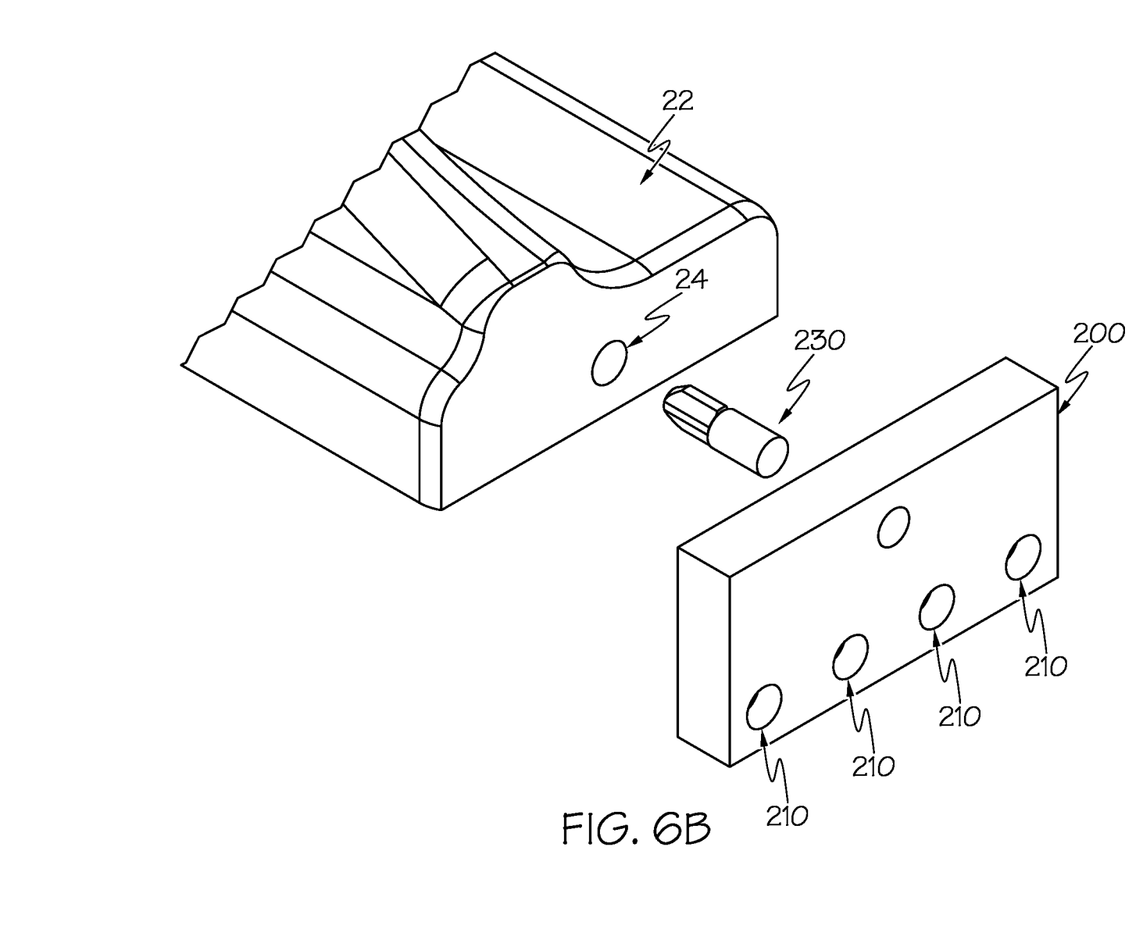
FIG. 6B depicts a partially exploded view of the guiding device of FIG. 1, according to one or more embodiments shown and described herein.

Referring now to FIGS. 6A and 6B, the front plate 200 may further include a connector opening 220 and a connector 230, which may be used to couple to the front plate 200 to one of the plurality of feet 22 of the guiding device 10. In these embodiments, the plurality of feet 22 may include a recess 24 which may receive the connector 230, thereby coupling the front plate 200 of the flex plate 100 to one of the plurality of feet 22.

In some embodiments, the connector 230 may include an end 231 having a truncated diamond-shaped cross-section. The end 231 may be received in recess 24 forming a snug-fit with the foot 22 of the guiding device 10 in a vertical direction and loose fit in a lateral direction, as is most clearly illustrated in FIG. 6A. In this embodiment, the diamond shape of the connector 230 may restrict up and down movement (e.g., movement in the +/y direction as illustrated in the coordinate axis of FIG. 6A) of the foot 22 f relative the front plate, while allowing for some lateral movement (e.g., movement in the +/−z direction as illustrated in the coordinate axis of FIG. 6A) relative to the front plate 200. It should be understood that, as the flex plate 100 elastically deforms during use, the lateral movement of the foot 22 relative to the front plate 200 may help decrease the torsional forces acting on the flex plate 100.

Figure 7:
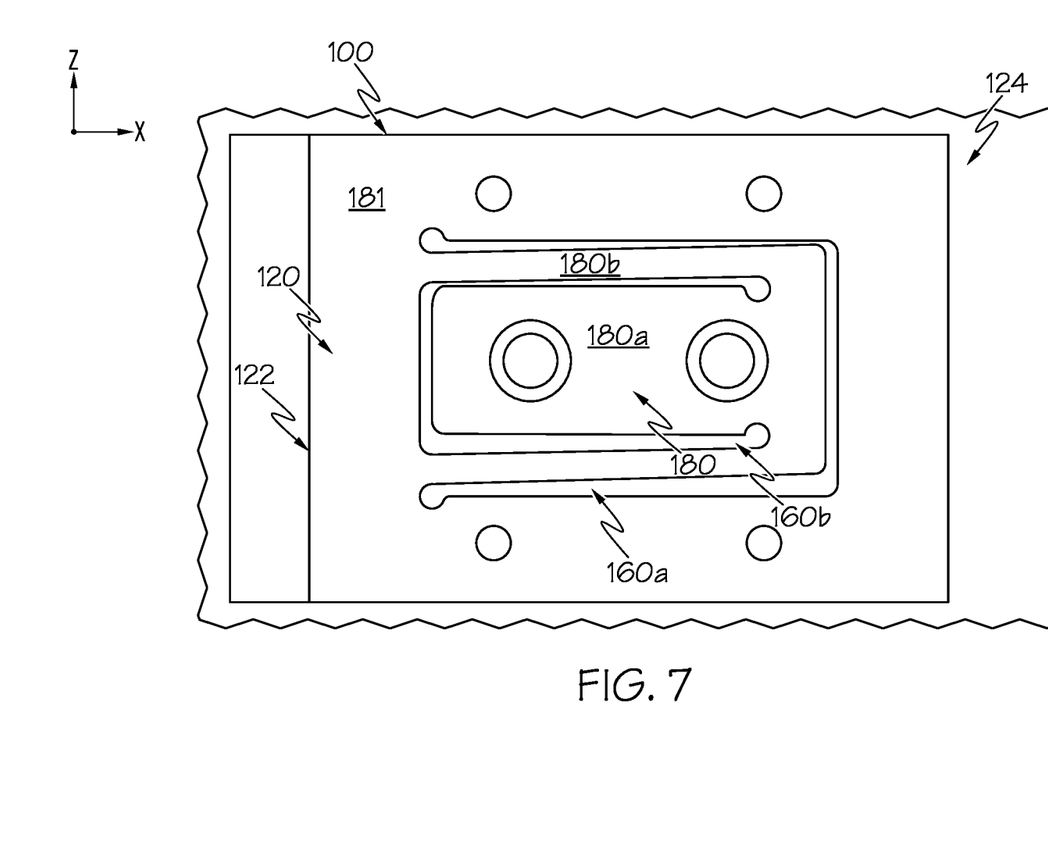
FIG. 7 depicts a bottom-side cross-sectional view of the flex plate of FIG. 1 about line 7-7 in a torqued position, according to one or more embodiments shown and described herein.

Turning now to FIG. 7, the flex plate 100 of the guiding device 10 is depicted in a torqued position. As shown in FIG. 7, the platen 12 of the guiding device 10 is beginning to rotate in a clockwise direction, resulting in a torsional force being applied on the central portion 180 of the flex plate 100 about a torsional axis (e.g., the y-axis as illustrated in the coordinate axis of FIG. 1). In these embodiments, the rotation of the leg 20a relative to rotational axis AA may cause the central portion 180 to deform. For example, the rotation of the leg 20a may cause the central portion 180 to deform in a first direction or second direction about the rotational axis (e.g., a clockwise direction A1 or a counterclockwise direction A2 about rotational axis AA as depicted in FIG. 1), as will be described in additional detail herein.

In these embodiments, as the leg 20a rotates relative to rotational axis AA in the first direction (e.g., clockwise direction A1), a torsional force is applied to the foot 22. As a result, the central portion 180 of the flex plate 100 which is secured to the foot 22 may deform in the first direction such that the torsional force applied by the foot 22 does not damage the guide shoe 50 or guide rail 51. More specifically, as depicted in FIG. 7, the inner central portion 180a may rotate in the first direction (e.g., the clockwise direction A1 about rotational axis AA depicted in FIG. 1) such that the inner central portion 180a compresses the intermediary portion 180b against the perimeter portion 181 of the flex plate 100. Because the central portion 180 of the flex plate 100 may deform to counteract the torsional forces created by rotation of the foot 22, the perimeter portion 181, including the guide holes 150 which are used to couple the guide shoe 50 to the flex plate 100, may remain stationary (e.g., do not move along the x-axis or z-axis of FIG. 7), which in turn alleviates the torsional force of the foot 22 from acting on the guide shoe 50 or guide rail 51. Furthermore, it should be understood that rotation of the foot 22 in the second direction (e.g., counterclockwise direction A2 about rotational axis AA depicted in FIG. 1) may result in deformation of the central portion 180 of the flex plate 100 in the opposite direction.

As has been described herein, the deformation of the central portion 180 of the flex plate 100 may help alleviate the stress on both the guide shoe 50 and the guide rails to which the flex plate 100 is coupled, which may in turn reduce bending and/or damage to either of the components.

Figure 8:
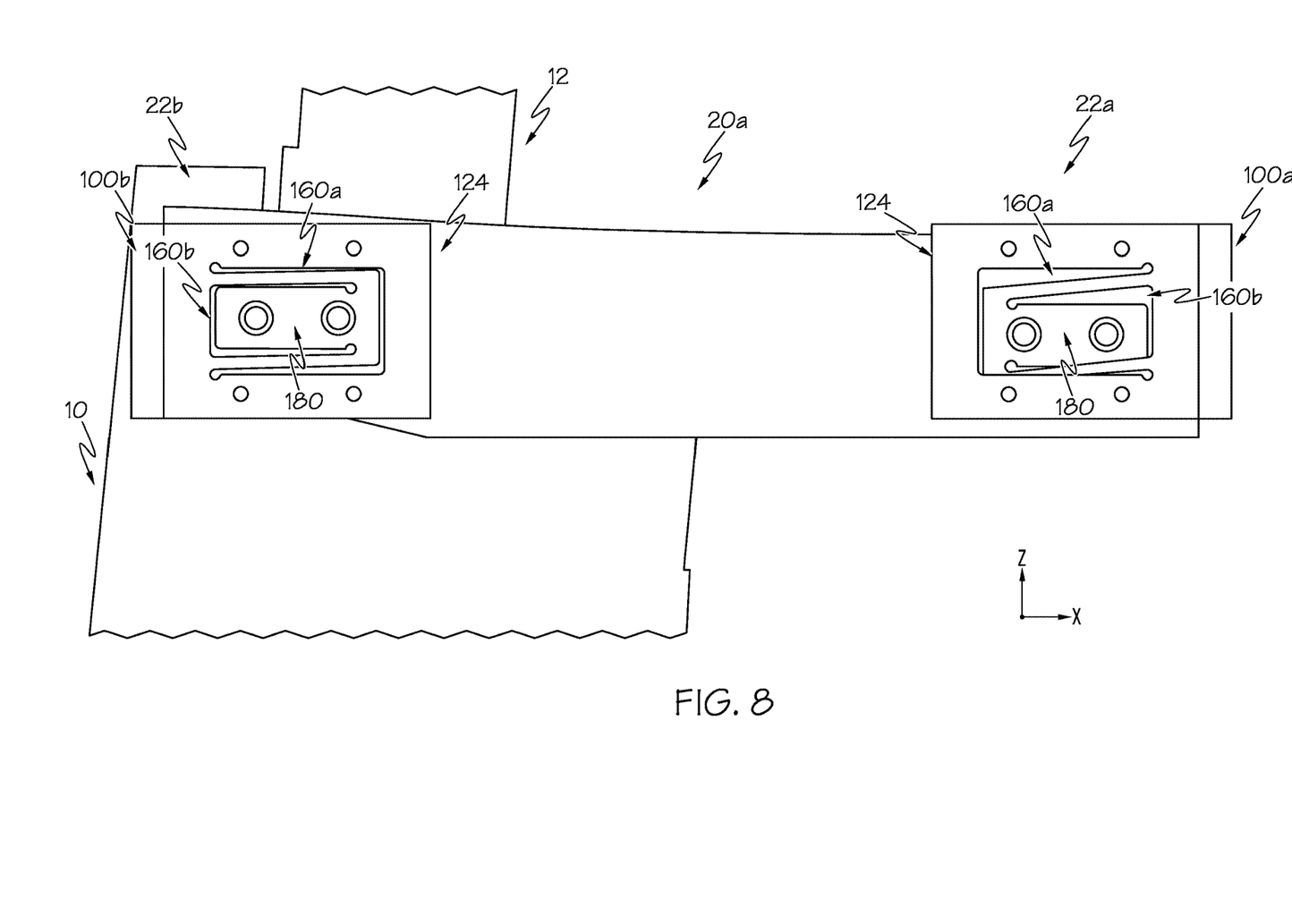
FIG. 8 depicts a bottom-side cross-sectional view of the guiding device of FIG. 1 about line 7-7 in the torqued position, according to one or more embodiments shown and described herein.

Turning now to FIG. 8, a bottom-side cross-sectional view of the guiding device 10 is depicted in the torqued position. More specifically, FIG. 8 depicts the first flex plate 100a coupled to the front foot 22a of the first leg 20a and the second flex plate 100b coupled to the back foot 22b of the first leg 20a in the torqued position.

As further depicted in FIG. 8, the first flex plate 100a and the second flex plate 100b may be coupled to the front foot 22a and back foot 22b, respectively, such that the first flex plate 100a and the second flex plate 100b are in a mirrored orientation, or reversed, from one another. For example, the first flex plate 100a and the second flex plate 100b may be coupled to the front foot 22a and the back foot 22b of the first leg 20a such that the back surface 124 of the first flex plate 100a faces the back surface 124 of the second flex plate 100b.

By coupling the first flex plate 100a and the second flex plate 100b in a mirrored orientation, the elastic deformation of the first flex plate 100a may compensate for the elastic deformation of the second flex plate 100b when a torsional force is applied to the plurality of legs 20 of the guiding device 10. For example, FIG. 8 depicts the leg 20a of the guiding device 10 beginning to rotate in a first direction (e.g., clockwise direction A1 relative to the rotational axis AA of FIG. 1) resulting in a torsional force being applied on the first and second feet 22a, 22b. In these embodiments, rotation of the first leg 20a may exert a torsional force along the length of the first leg 20a, which may in turn cause the central portion 180 of the first and second flex plates 100a, 100b coupled to the front foot 22a and the back foot 22b of the first leg 20a, respectively, to deform.

As can be appreciated by the illustration of FIG. 8, the rotation of the leg 20a (e.g., relative to the rotational axis AA of FIG. 1) in the first direction may result in a torsional force being applied to the second foot 22b. As a result, the central portion 180 of the flex plate 100b which is secured to the foot 22b may deform, such that the torsional force created by the rotation of the leg 20a does not damage the second guide shoe 50b to which the flex plate 100b is mounted or guide rail. More specifically, the inner central portion 180a of the flex plate 100b may rotate in the first direction (e.g., the clockwise direction A1 about rotational axis AA depicted in FIG. 1) such that the inner central portion 180a compresses the intermediary portion 180b against the perimeter portion 181 of the flex plate 100.

In these embodiments, the rotation of the leg 20a may simultaneously result in the torsional force being applied to the first foot 22a. Because the first flex plate 100a is mounted in a mirrored-orientation to flex plate 100b, the torsional force acting on the first foot 22a may similarly cause the inner central portion 180a of the first flex plate 100a to deform in the first direction (e.g., the clockwise direction A1 about rotational axis AA depicted in FIG. 1). As a result, the torsional force created by the rotation of the platen 12 does not damage the first guide shoe 50b to which the flex plate 100a is mounted or guide rail.

Referring still to FIG. 8, as the torsional force causes the central portion 180 of the second flex plate 100b to deform, the torsional force acting upon the foot 22a may cause the central portion 180 of the first flex plate 100a to similarly deform in order to compensate for the deformation occurring in the second flex plate 100b. In these embodiments, the deformation of the central portion 180 of the first flex plate 100a and the second flex plate 100b may compensate for the rotation of the first foot 22a and second foot 22b, respectively. Because the central portion 180 of the first and second flex plates 100a, 100b are able to deform along with the first foot 22a and second foot 22b, the perimeter portion 181 of the first and second flex plate 100a, 100b, including the plurality of guide shoe holes 150 on the first and second flex plate 100a, 100b, may remain stationary (e.g., do not move along the x-axis or z-axis of FIG. 8) and in alignment throughout the injection molding process. By ensuring that the perimeter portion 181 and guide holes 150 remain stationary, the torsional forces acting upon the guide shoes 50 are alleviated, thereby minimizing the stress experienced by the components of the guiding device 10.

As can be appreciated in view of the foregoing, minimizing the stress experienced by the components of the guiding device 10 (e.g., the guide shoes and guide rails) may help ensure that damage to the various components of the guiding device 10 can be reduced, thereby increasing the work life of the guiding device and ensuring optimal part quality during injection molding processes.

Figure 9:
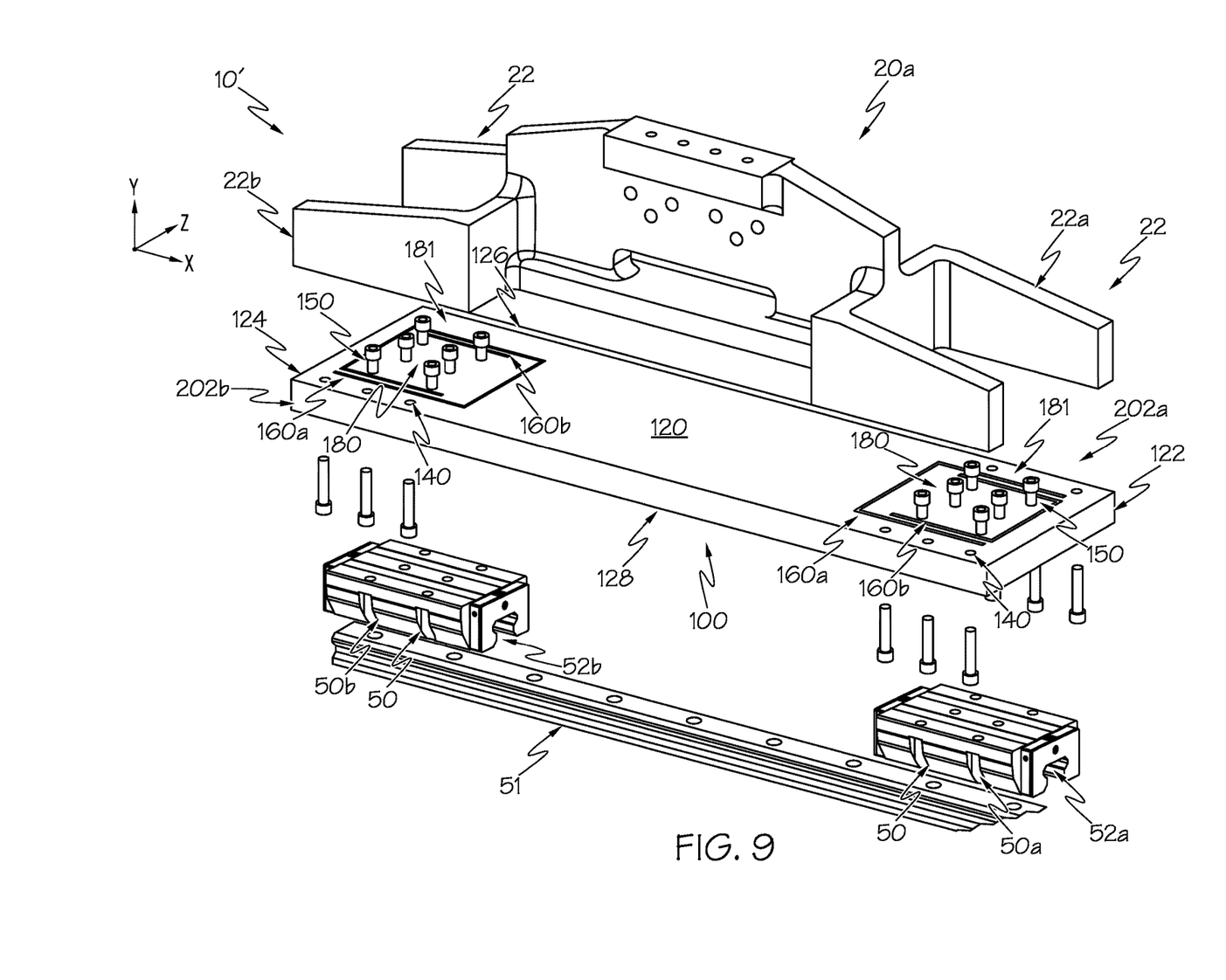
FIG. 9 depicts another embodiment of a guiding device for an injection molding machine, according to one or more embodiments shown and described herein.

Turning now to FIG. 9, another embodiment of a guiding device 10' is shown. It should be appreciated that the guiding device 10' is similar to the guiding device 10 described herein. As such, like structure is indicated with like reference numerals.

In the embodiment depicted in FIG. 9, the guiding device 10' may include a first leg 20a having a plurality of feet 22, such as a front foot 22a and a back foot 22b. In these embodiments the first leg 20a may have a length $L_L$ that extends from the front foot 22a to the back foot 22b. The guiding device 10' may further include a plurality of shoes 50. For example, the front foot 22a of the first leg 20a may include a first shoe 50a, and the back foot 22b of the first leg 20a may include a second shoe 50b. As has been described herein, the plurality of shoes 50 may include an opening 52 which receives a guide rail 51 of an injection molding machine (not pictured) in order to couple the guiding device 10 to the injection molding machine. For example, the first shoe 50a may include a first opening 52a, while the second shoe 50b may include a second opening 52b.

Referring still to FIG. 9, a flex plate 100 may be positioned between the plurality of feet 22 and the plurality of guide shoes 50 of the guiding device 10'. In these embodiments, the flex plate 100 may include a body 120 extending between a front surface 122, a back surface 124, a top surface 126, and a bottom surface 128. As further depicted in FIG. 9, the flex plate 100 may extend from the front foot 22a to the back foot 22b of the first leg 20a, such that a length of the flex plate $L_F$ from the front surface 122 to the back surface 124 is equal to the length of the first leg $L_L$.

The flex plate 100 may further include a first portion 102a positioned near the front surface 122 of the flex plate and a second portion 102b positioned near the back surface 124 of the flex plate 100. In these embodiments, the first portion 102a may be used to couple the flex plate 100 to the front foot 22a of the first leg 20a and the first shoe 50a, while the second portion 102b may be used to couple the flex plate 100 to the back foot 22b of the first leg 20a and the second shoe 50b.

In these embodiments, the first portion 102a and the second portion 102b of the flex plate may be identical in structure. For example, both the first portion 102a and the second portion 102b may include a plurality of slots 160, such as a first slot 160a and a second slot 160b. The plurality of slots may further include a plurality of U-shaped slots, although it should be understood that the plurality of slots 160 may take any other suitable shape. In these embodiments, the first slot 160a may be disposed outside and/or about the second slot 160b, and may be formed such that the first and second slots 160a, 160b are inverted from one another.

Although the first portion 102a and the second portion 102b of the flex plate may be identical in structure, the first portion 102a and the second portion 102b may be arranged in a mirrored-orientation. For example, the open end of the U-shaped first slot 160a of the first portion 102a may be directed towards the front surface 122 of the flex plate 100, while the first slot 160a of the second portion 102b may be directed towards the back surface 124 of the flex plate 100, as is most clearly depicted in FIG. 9.

In these embodiments, the first slot 160a and the second slot 160b of both the first portion 102a and the second portion 102b may define a central portion 180 and a perimeter portion 181 of the first portion 102a and the second portion 102b of the flex plate 100. For example, the central portion 180 may be defined as the portion of the first portion 102a and the second portion 102b, respectively, that is positioned within the perimeter of the first slot 160a. In contrast, the perimeter portion 181 may be defined as the portion of the first portion 102a and the second portion 102b, respectively, that is positioned outside the perimeter of the first slot 160a. It should be noted that, because the first slot 160a and the second slot 160b extend completely through the body 120 of the flex plate 100, the central portion 180 of the first portion 102a and the second portion 102b may both be elastically deformable within the first slot 160a and the second slot 160b. Furthermore, the perimeter portion 181 and the central portion 180 of both the first portion 102a and the second portion 102b of the flex plate 100 may be pivotable relative to each other when the flex plate 100 is attached to the plurality of feet 22 and the plurality of shoes 50.

Referring still to FIG. 9, the first portion 102*a* and the second portion 102*b* of the flex plate 100 may further include a plurality of through holes 140, which may extend completely though the body 120 between the top surface 126 and the bottom surface 128. In these embodiments, the through holes 140 may be used to attach the flex plate 100 to the plurality of feet 22 of the guiding device 10. For example, in some embodiments, the flex plate 100 may be releasably coupled to the front foot 22*a* and the back foot 22*b* by providing a screw, or other similar releasable coupler, through the plurality of through holes 140 of the first portion 102*a* and the second portion 102*b* of the flex plate 100, respectively, and into a plurality of recesses (not pictured) in the end portion of front foot 22*a* and the back foot 22*b* to which the flex plate 100 is coupled. It should be understood that releasably coupling the flex plate 100 to the plurality of feet 22 may allow for the flex plate 100 to be easily replaced in the event the flex plate 100 is damaged, without causing any additional stress or damage to the plurality of feet 22.

As further shown in FIG. 9, the plurality of through holes 140 may be positioned within the perimeter portion 181 of the flex plate 100. Because the plurality of through holes 140 may be positioned within the perimeter portion 181, the flex plate 100 may pivot relative to both the front foot 22*a* and the back foot 22*b* of the first leg 20*a* to which the flex plate 100 is coupled.

Referring still to FIG. 9, the first portion 102*a* and the second portion 102*b* of the flex plate 100 may include a plurality of guide shoe holes 150. In these embodiments, the plurality of guide shoe holes 150 may be formed in the central portion 180 of both the first portion 102*a* and the second portion 102*b* of the flex plate 100, and may extend through the body 120 of the flex plate 100 and into the first guide shoe 50*a* and second guide shoe 50*b*, respectively. The plurality of guide shoe holes 150 may be used to align and couple the first portion 102*a* and the second portion 102*b* of the flex plate 100 with one of the plurality of guide shoes 50 of the guiding device 10. For example, the flex plate 100 may be releasably coupled to the plurality of shoes 50 by providing a screw, or other similar releasable coupler, through the plurality of guide shoe holes 150 of the first portion 102*a* and the second portion 102*b* of the flex plate 100 and into the plurality of guide shoes 50. It should be understood that releasably coupling the flex plate 100 to the plurality of guide shoes 50 may allow for the flex plate 100 to be easily replaced in the event the flex plate 100 is damaged, without causing any additional stress or damage to the foot.

As further depicted in FIG. 9, the plurality of guide shoe holes 150 may be positioned within the central portion 180 of both the first portion 102*a* and the second portion 102*b* of the flex plate 10. Because the plurality of guide shoe holes 150 are within the central portion 180 of the flex plate 100, the foot 22*a* and the foot 22*b* may pivot relative to the central portion 180 of the first portion 102*a* and the second portion 102*b*, respectively of the flex plate 100.

It should be understood that the flex plate 100 depicted in FIG. 9 may respond to torsional forces in a similar manner as the flex plate 100 depicted in FIGS. 1-8. That is to say, the flex plate 100 may deform to ensure that the plurality of guide shoes 50 remain stationary throughout the injection molding process, such that torsional forces acting upon the plurality of guide shoes 50 and guide rail 51 are alleviated. However, because the plurality of holes 140 that couple the flex plate 100 to the front foot 22*a* and back foot 22*b*, respectively, are positioned within the perimeter portion 181 of the flex plate 100 in the embodiment depicted in FIG. 9, the perimeter portion 181 of both the first portion 102*a* and second portion 102*b* of the flex plate 100 may pivot relative the central portion 180 of the flex plate 100 when the torsional force is exerted on the flex plate 100. In these embodiments, the central portion 180 of both the first portion 102*a* and the second portion 102*b* may remain stationary while the perimeter portion 181 of both the first portion 102*a* and the second portion 102*b* pivot.

As should be appreciated in view of the foregoing, a flex plate for a guiding device of an injection molding machine is described herein. The flex plate includes a body extending between a front surface, a back surface, a top surface, and a bottom surface, and a plurality of through holes extend between the top surface and the bottom surface for aligning the flex plate with a foot of the guiding device. A plurality of guide shoe holes are formed in the bottom surface of the flex plate for coupling the flex plate to a guide shoe of the guiding device. The flex plate further includes a front plate for coupling the front surface of the flex plate and the foot of the guiding device, and a plurality of slots defining a central portion of the flex plate. The central portion of the flex plate may be elastically deformable about a torsional axis such that the central portion can pivot relative to both the guide shoe and the foot of the guiding device. In additional embodiments, a guiding device for an injection molding machine is disclosed. The guiding device may include a plurality of flex plates, with the flex plates being mounted on the guiding device in a mirrored orientation such that deformation of a first flex plate is compensated by an opposite deformation of a second flex plate. An injection molding machine including the guiding devices and flex plates described herein is further disclosed.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A flex plate for a guiding device of an injection molding machine, the flex plate comprising:
    a body extending between a front surface, a back surface, a top surface, and a bottom surface;
    a plurality of through holes extending between the top surface and the bottom surface for attaching the flex plate with a foot of the guiding device;
    a plurality of guide shoe holes formed in the bottom surface of the flex plate for coupling the flex plate to a guide shoe of the guiding device;
    a front plate for coupling the front surface of the flex plate and the foot of the guiding device; and
    a plurality of slots defining a central portion of the flex plate;
    wherein the central portion of the flex plate is elastically deformable about a torsional axis such that the central portion can pivot relative to both the guide shoe and the foot of the guiding device.

2. The flex plate of claim 1, wherein the plurality of slots defining the central portion of the flex plate extend between the top surface and the bottom surface of the flex plate.

3. The flex plate of claim 1, wherein the plurality of slots comprise a plurality of U-shaped slots.

4. The flex plate of claim 3, wherein the plurality of U-shaped slots include a plurality of endpoints.

5. The flex plate of claim 4, wherein the plurality of endpoints of the plurality of U-shaped slots are curved in shape.

6. The flex plate of claim 1, wherein the plurality of slots comprise an outer slot and an inner slot.

7. The flex plate of claim 1, wherein the plurality of through holes are formed within the central portion of the flex plate.

8. The flex plate of claim 1, wherein the plurality of guide shoe holes are formed outside of the central portion of the flex plate.

9. The flex plate of claim 1, further comprising a plurality of apertures in the front surface for coupling the flex plate to the front plate.

10. The flex plate of claim 1, further including a connector for coupling the front plate to the foot of the guiding device.

11. The flex plate of claim 10, wherein an end of the connector for coupling the front plate to the foot of the guiding device has a truncated diamond-shaped cross-section, the end of the connector to be received in the foot of the guiding device forming a snug-fit with the foot of the guiding device in a vertical direction and loose fit in a lateral direction.

* * * * *